US012560977B2

(12) United States Patent (10) Patent No.: US 12,560,977 B2
Mori (45) Date of Patent: Feb. 24, 2026

(54) ELECTRONIC DEVICE

(71) Applicant: Panasonic Intellectual Property Management Co., Ltd., Osaka (JP)

(72) Inventor: Takeshi Mori, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 126 days.

(21) Appl. No.: 18/227,951

(22) Filed: Jul. 30, 2023

(65) Prior Publication Data

US 2023/0367374 A1 Nov. 16, 2023

Related U.S. Application Data

(63) Continuation of application No. PCT/JP2022/002315, filed on Jan. 24, 2022.

(30) Foreign Application Priority Data

Feb. 26, 2021 (JP) ................................. 2021-029414

(51) Int. Cl.
*G06F 1/16* (2006.01)
(52) U.S. Cl.
CPC .......... *G06F 1/1679* (2013.01); *G06F 1/1681* (2013.01)
(58) Field of Classification Search
CPC .... G06F 1/1616; G06F 1/1654; G06F 1/1669; G06F 1/1679; G06F 1/1681; H01R 13/639
See application file for complete search history.

(56) References Cited

U.S. PATENT DOCUMENTS

| | | | | |
|---|---|---|---|---|
| 2003/0052857 A1* | 3/2003 | Pappas | .................... | G06F 1/162 |
| | | | | 345/156 |
| 2004/0246666 A1* | 12/2004 | Maskatia | .............. | G06F 1/1624 |
| | | | | 361/679.57 |
| 2011/0216485 A1 | 9/2011 | Kang et al. | | |

(Continued)

FOREIGN PATENT DOCUMENTS

| | | |
|---|---|---|
| JP | 2006-184998 A | 7/2006 |
| JP | 2008-176799 A | 7/2008 |

(Continued)

OTHER PUBLICATIONS

International Search Report for related Application No. PCT/JP2022/002315, mailed Mar. 8, 2022.

(Continued)

*Primary Examiner* — Dameon E Levi
(74) *Attorney, Agent, or Firm* — Renner, Otto, Boisselle & Sklar, LLP

(57) ABSTRACT

An electronic device is an electronic device including a first unit and a second unit that are detachably attached to each other, and includes a first connector that is provided in the first unit, a socket that is provided in the second unit, the first unit being attached to and detached from the socket in a first direction, a second connector that is provided in the socket, the second connector coming into contact with the first connector in the first direction to be electrically connected, and a lock mechanism that is provided in the socket, the lock mechanism pulling the first unit into a back of the socket in the first direction to maintain contact between the first unit and the socket.

14 Claims, 15 Drawing Sheets

(56)            References Cited

U.S. PATENT DOCUMENTS

| | | | |
|---|---|---|---|
| 2012/0014051 A1* | 1/2012 | Senatori ............... | G06F 1/1675 |
| | | | 361/679.01 |
| 2017/0177030 A1 | 6/2017 | Agata et al. | |
| 2017/0285693 A1 | 10/2017 | Mori et al. | |
| 2018/0184533 A1* | 6/2018 | Katsuyama ........... | G06F 1/1632 |
| 2019/0361492 A1* | 11/2019 | Urimoto ................. | H05K 5/03 |
| 2020/0026329 A1 | 1/2020 | Fujii et al. | |

FOREIGN PATENT DOCUMENTS

| | | | | | |
|---|---|---|---|---|---|
| JP | 2011-187043 A | 9/2011 | | | |
| JP | 2016-081130 A | 5/2016 | | | |
| JP | 2017-116988 A | 6/2017 | | | |
| JP | 2017-123100 A | 7/2017 | | | |
| JP | 2019-067437 A | 4/2019 | | | |
| JP | 2020-013375 A | 1/2020 | | | |
| KR | 2010055400 A | * | 5/2010 | ........... | G06F 1/1616 |
| WO | 2017/077674 A1 | 5/2017 | | | |

OTHER PUBLICATIONS

1 The EPC Office Action dated Jul. 5, 2024 for the related European Patent Application No. 22759185.6.

* cited by examiner

FIG. 7C

ELECTRONIC DEVICE

BACKGROUND

1. Technical Field

The present disclosure relates to an electronic device.

2. Description of the Related Art

For example, Patent Literature (PTL) 1 discloses an electronic device including a tablet terminal (first unit) including a touch screen and a keyboard unit (second unit) detachably attached to the tablet terminal and including a keyboard. The keyboard unit includes a socket to which the tablet terminal is attached. A connector that comes into contact with a connector of the tablet terminal to be electrically connected is provided in the socket.

PTL 1 is Unexamined Japanese Patent Publication No. 2019-67437.

SUMMARY

Meanwhile, when the electronic device is used in a severe environment where large vibration occurs, there is a possibility that electrical connection between the tablet terminal and the keyboard unit is momentarily disconnected. That is, the tablet terminal and the keyboard unit are momentarily separated by the large vibration, and thus, there is a possibility that the connector of the tablet terminal and the connector of the keyboard unit are momentarily separated.

Therefore, an object of the present disclosure is to suppress disconnection due to vibration of electrical connection between a first unit and a second unit in an electronic device including the first unit and the second unit that are detachably attached to each other.

In order to solve the above problem, according to one aspect of the present disclosure, there is provided an electronic device including a first unit and a second unit that are detachably attached to each other. The electronic device includes a first connector that is provided in the first unit, a socket that is provided in the second unit, the first unit being attached to and detached from the socket in a first direction, a second connector that is provided in the socket, the second connector coming into contact with the first connector in the first direction to be electrically connected, and a lock mechanism that is provided in the socket, the lock mechanism pulling the first unit into a back of the socket in the first direction to maintain contact between the first unit and the socket.

According to the present disclosure, in the electronic device including the first unit and the second unit that are detachably attached to each other, it is possible to suppress the disconnection due to the vibration of the electrical connection between the first unit and the second unit.

BRIEF DESCRIPTION OF THE DRAWINGS

FIG. 7C is a perspective view illustrating a state (locked state) where the hook part of the lock shaft is caught on the annular member.

DETAILED DESCRIPTION

Exemplary embodiments will be described below in detail with reference to the drawings as appropriate. However, a detailed description more than necessary may be omitted. For example, the detailed description of already well-known matters and the overlap description of substantially the same configurations may not be described. This is to avoid an unnecessarily redundant description below and to facilitate understanding by those skilled in the art.

Note that, the inventor provides the accompanying drawings and the description below to help those skilled in the art to fully understand the present disclosure, and do not intend to use the accompanying drawings or the description below to limit the subject matter described in the claims.

Figure 1:
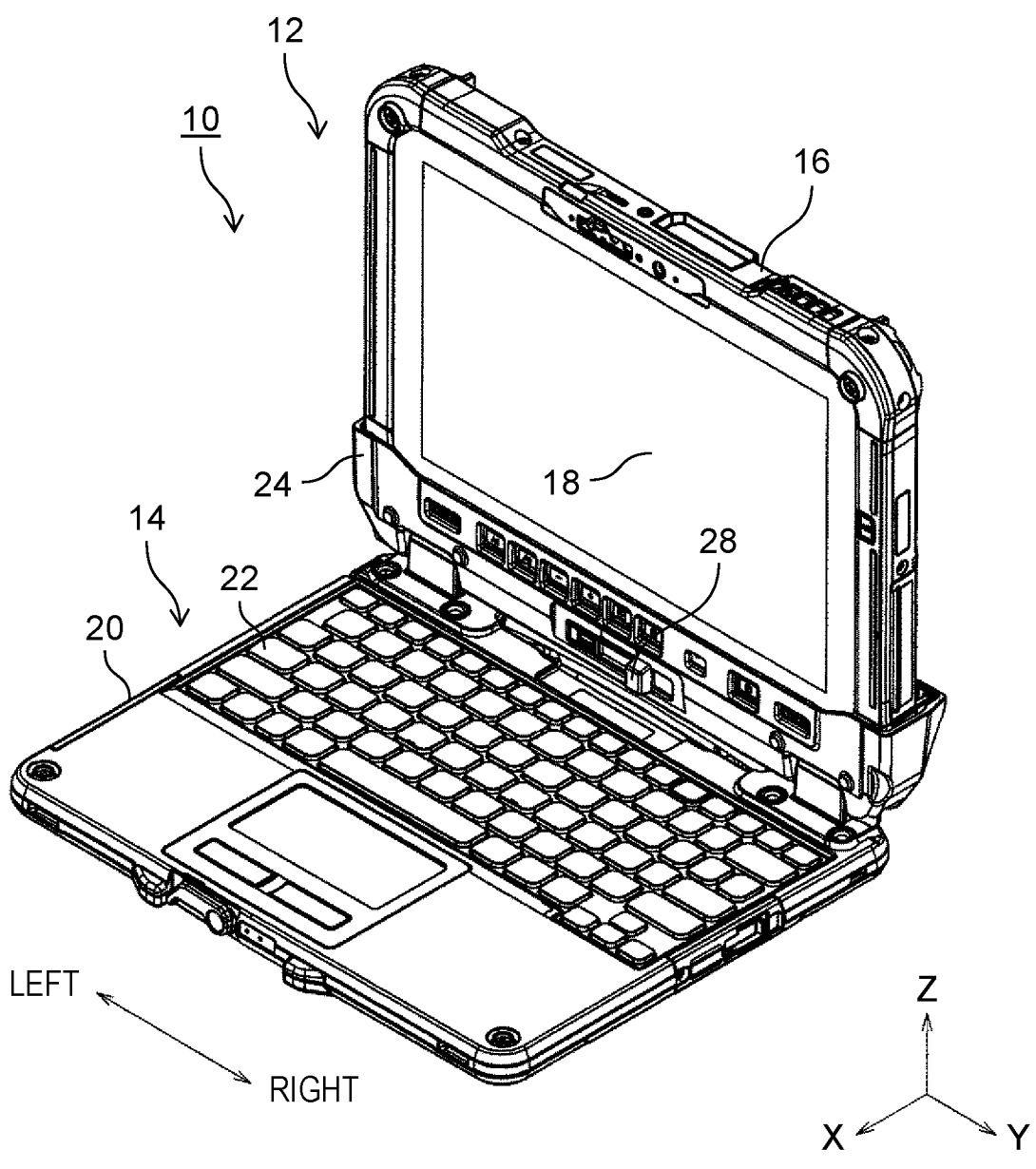
FIG. 1 is a perspective view of a detachable PC which is an example of an electronic device according to an exemplary embodiment of the present disclosure.

FIG. 1 is a perspective view of a detachable PC which is an example of an electronic device according to an exemplary embodiment of the present disclosure.

Note that, an X-Y-Z rectangular coordinate system illustrated in the drawings is for facilitating understanding of the exemplary embodiments of the present disclosure, and does not limit the exemplary embodiments. An X-axis direction indicates a depth direction of the electronic device, a Y-axis direction (second direction) indicates a width direction, and a Z-axis direction (first direction) indicates a height direction.

As illustrated in FIG. 1, so-called detachable PC 10 that is the electronic device includes tablet terminal 12 (first unit) and keyboard unit 14 (second unit) that are detachably attached to each other.

Tablet terminal 12 includes housing 16 and touch screen panel 18 (an example of a touch screen) provided in housing 16. Keyboard unit 14 includes housing 20 and keyboard 22 provided in housing 20.

Socket 24 to and from which tablet terminal 12 is attached and detached is provided in keyboard unit 14. One end of tablet terminal 12 in the height direction (Z-axis direction) is detachably fitted into socket 24.

Figure 2:
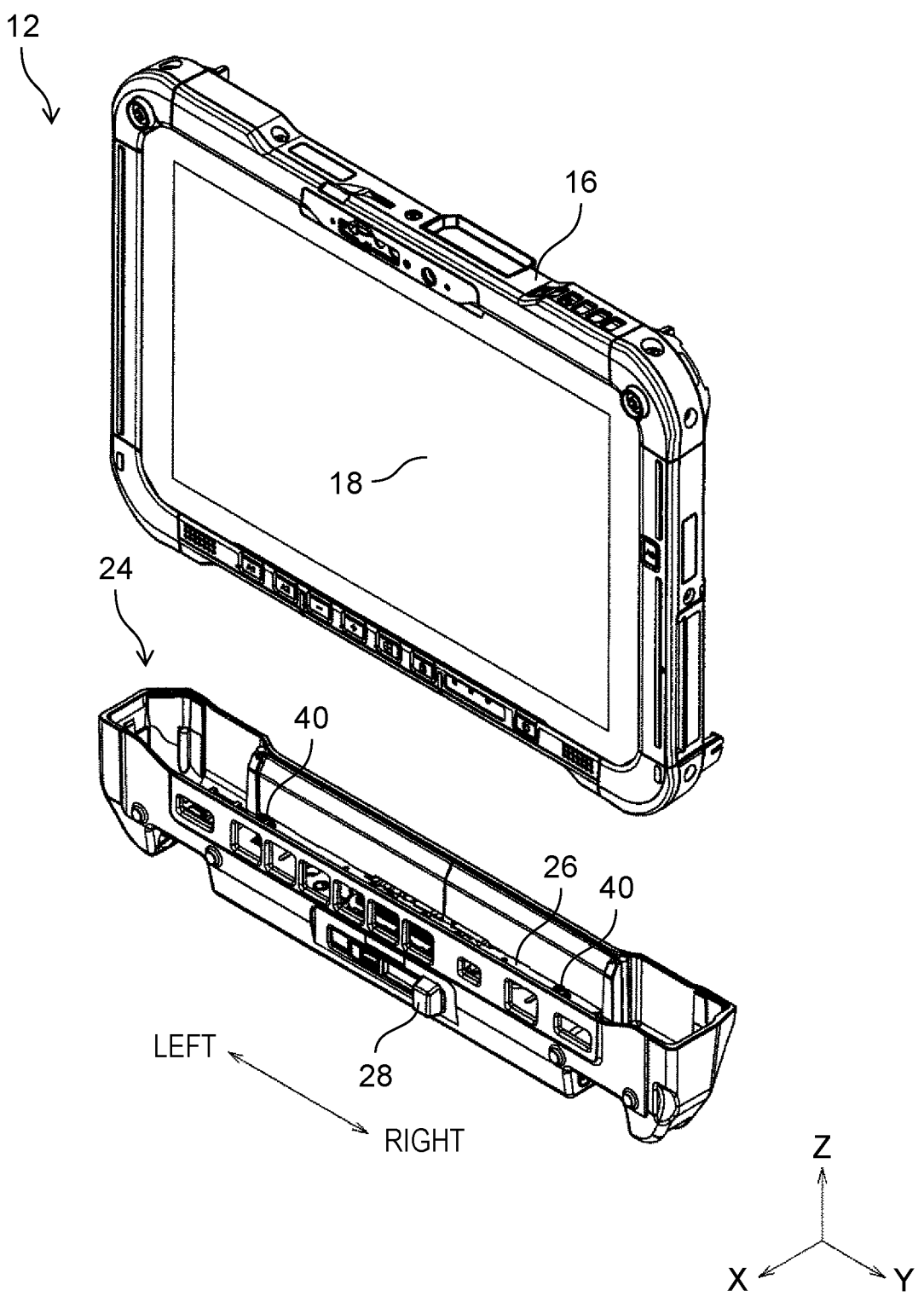
FIG. 2 is a perspective view of a state where a tablet terminal is detached from a socket.

FIG. 2 is a perspective view of a state where the tablet terminal is removed from the socket.

As illustrated in FIG. 2, docking unit 26 that docks with tablet terminal 12 is provided in socket 24. Tablet terminal 12 attached to socket 24 is fixed to socket 24 through this docking unit 26. While details will be described later, tablet terminal 12 is fixed to socket 24 (that is, docking unit 26) and released from the fixed state by a user operating lock knob 28 provided on socket 24 to be movable in the width direction (Y-axis direction).

Figure 3:
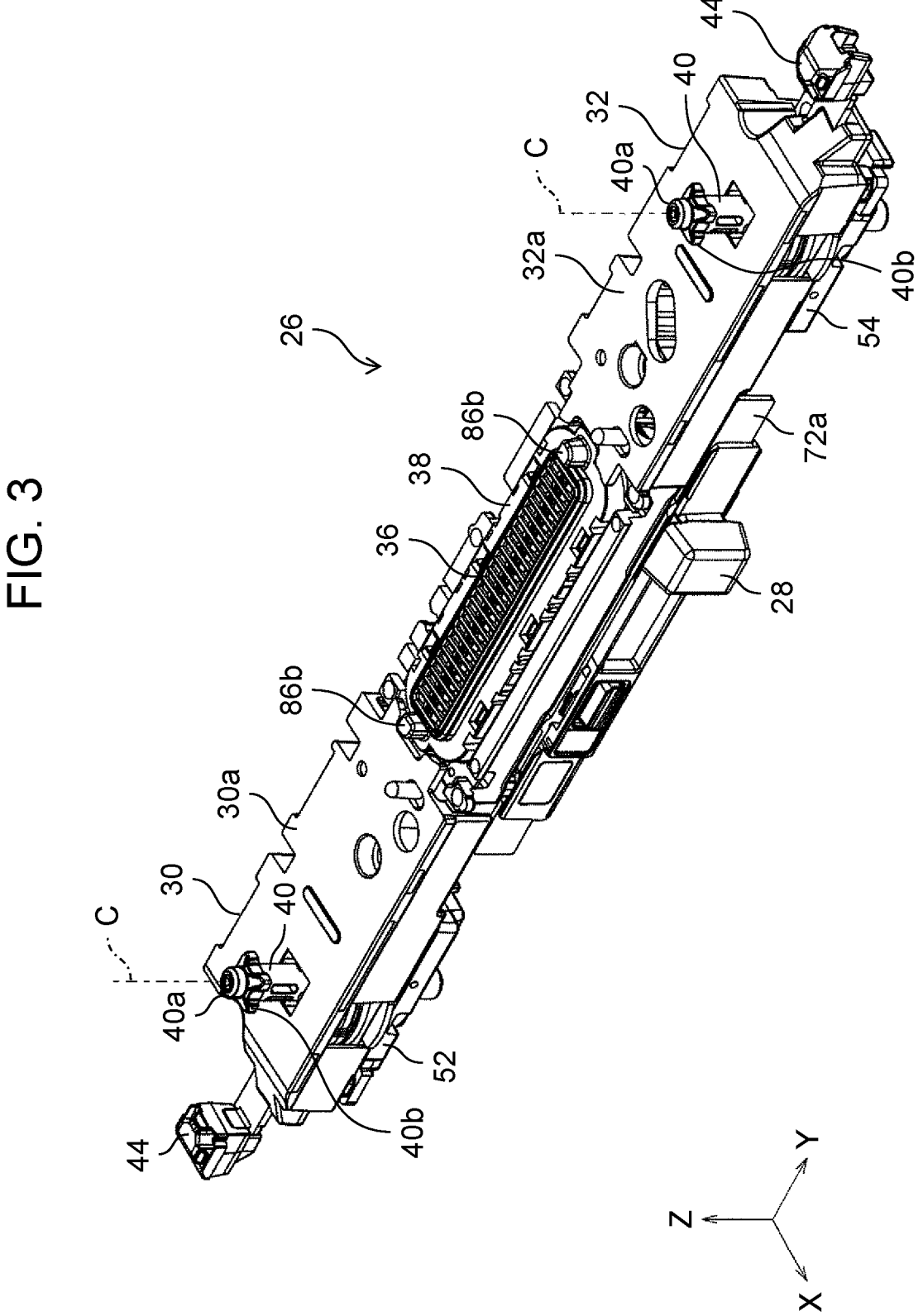
FIG. 3 is a perspective view of a docking unit.

FIG. 3 is a perspective view of the docking unit.

As illustrated in FIG. 3, docking unit 26 includes support members 30 and 32 that support tablet terminal 12 attached to socket 24. Support members 30 and 32 include seating surfaces 30a and 32a on which tablet terminal 12 is seated.

Figure 4:
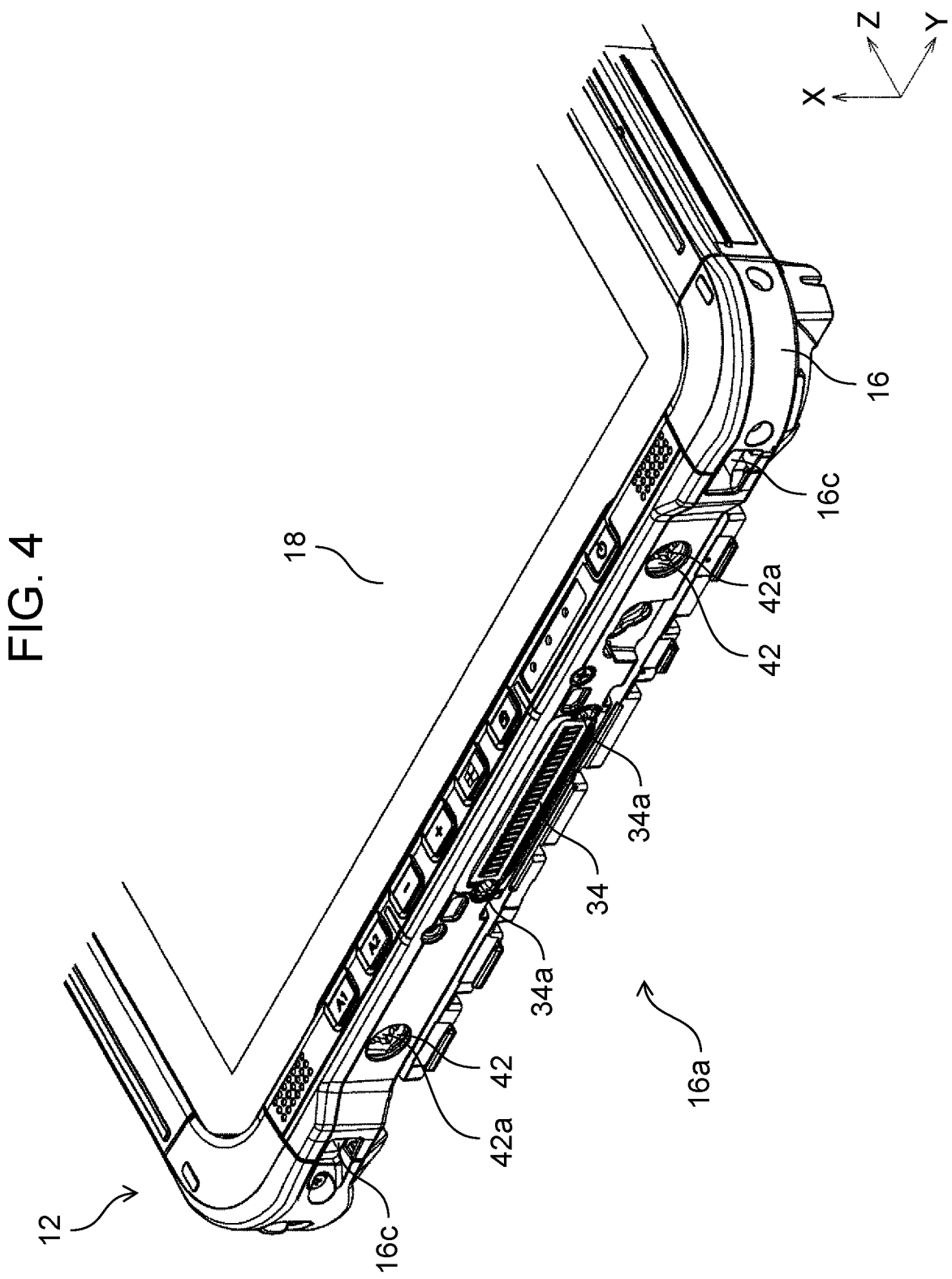
FIG. 4 is a perspective view of the tablet terminal illustrating a docking surface of the tablet terminal docked with the docking unit.
Figure 5:
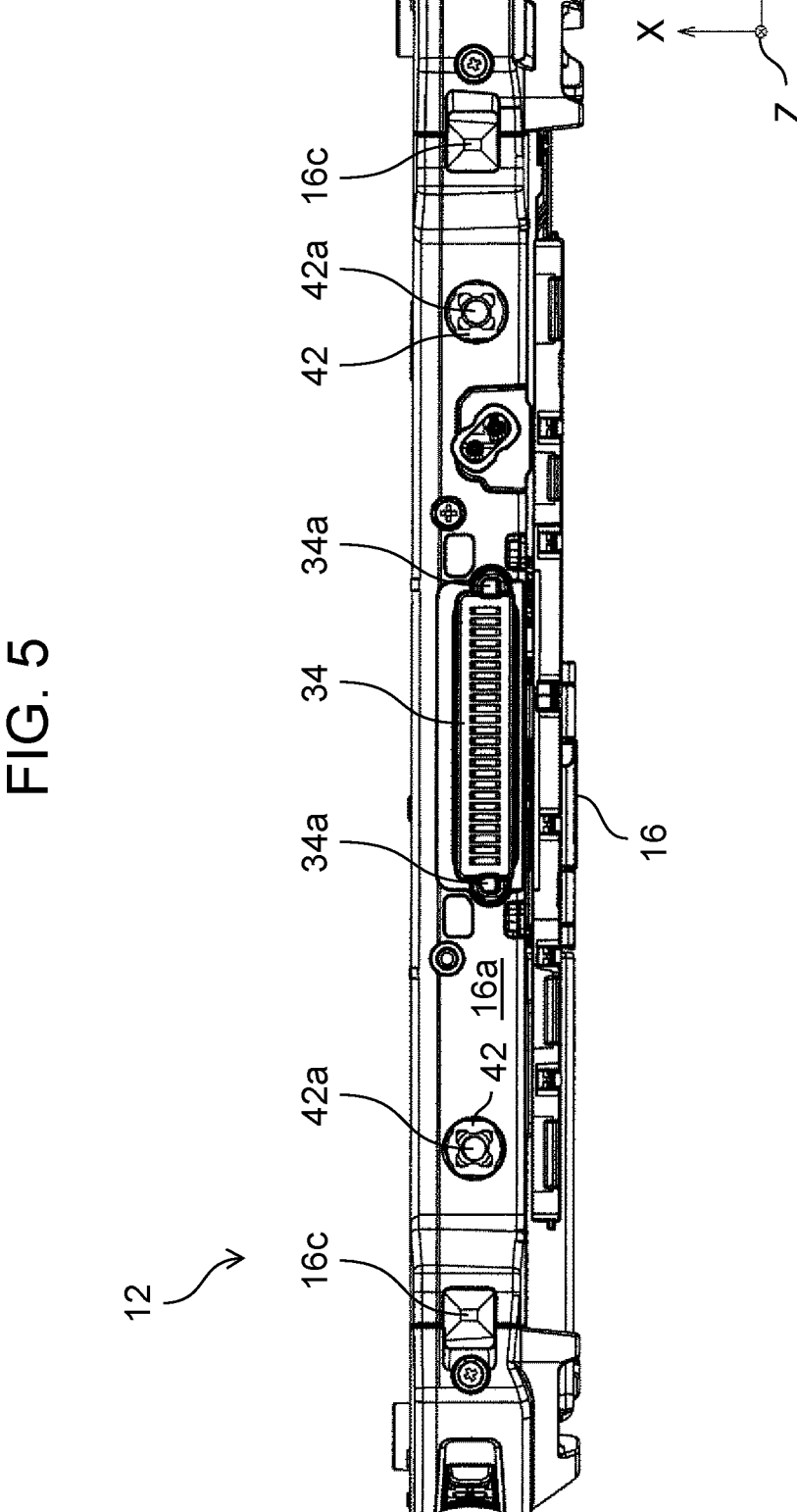
FIG. 5 is a diagram illustrating the docking surface of the tablet terminal.
Figure 6:
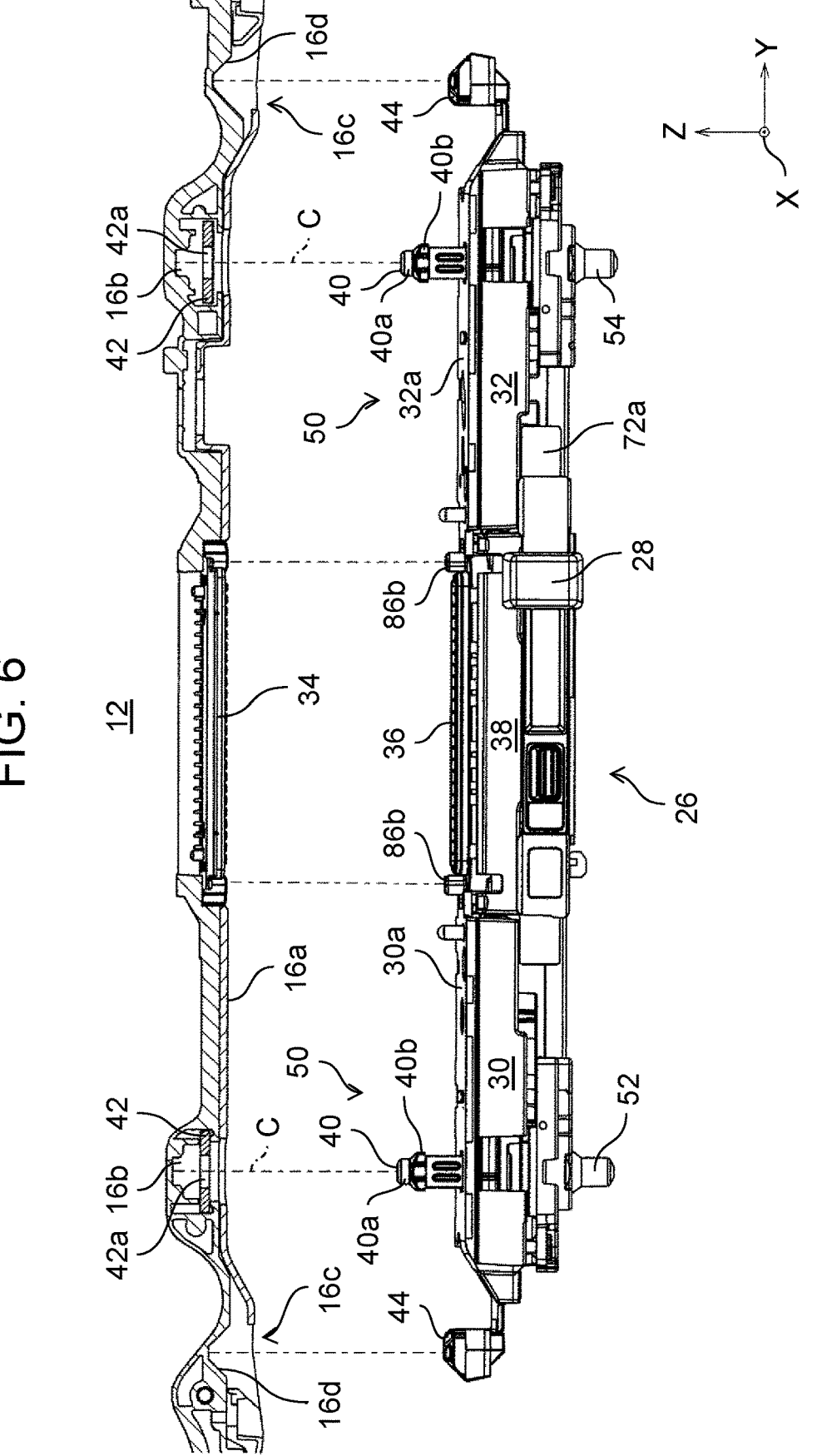
FIG. 6 is a partial cross-sectional view illustrating the docking unit and a part of the tablet terminal facing each other.

FIG. 4 is a perspective view of the tablet terminal illustrating a docking surface of the tablet terminal docked with the docking unit. In addition, FIG. 5 is a diagram illustrating the docking surface of the tablet terminal. FIG. 6 is a partial cross-sectional view illustrating the docking unit and a part of the tablet terminal facing each other.

As illustrated in FIGS. 4 and 5, first connector 34 is provided on docking surface 16a which is one end surface of housing 16 of tablet terminal 12 seated on seating surfaces 30a and 32a of support members 30 and 32 of docking unit 26 in the height direction (Z-axis direction). First connector 34 is provided at a central portion of docking surface 16a in the width direction (Y-axis direction).

As illustrated in FIG. 6, second connector 36 that comes into contact with and electrically connected to first connector 34 is provided in docking unit 26 (that is, socket 24). Second connector 36 is provided at a central portion of docking unit 26 in the width direction (Y-axis direction). That is, second connector 36 is disposed between support members 30 and 32. Note that, although details will be described later, second connector 36 is held by connector holder 38 provided in docking unit 26 to be shiftable in the height direction (Z-axis direction).

As illustrated in FIG. 6, tablet terminal 12 approaches docking unit 26 in the height direction (Z-axis direction), that is, tablet terminal 12 is attached to socket 24 in the height direction. Accordingly, first connector 34 comes into contact with second connector 36 in the height direction. Accordingly, first connector 34 and second connector 36 are electrically connected.

To maintain contact, that is, electrical connection between first connector 34 and second connector 36, tablet terminal 12 attached to socket 24 is fixed to docking unit 26 in socket 24. Thus, lock shafts 40 are provided in docking unit 26.

As illustrated in FIGS. 3 and 6, in the case of the present exemplary embodiment, two lock shafts 40 are provided in docking unit 26 with second connector 36 interposed therebetween. Lock shafts 40 extend in the height direction (Z-axis direction). In addition, although described in detail later, lock shafts 40 are provided in docking unit 26 to be rotatable about rotation center line C extending in the height direction and shiftable in the height direction.

Further, lock shaft 40 includes engagement part 40a having a cylindrical shape and provided at a distal end close to tablet terminal 12, and hook part 40b having a non-circular shape and protruding in a direction orthogonal to rotation center line C as viewed in the height direction (as viewed in the Z-axis direction). Hook part 40b has a non-circular shape such as a square shape or a cross shape as viewed in the height direction.

As illustrated in FIG. 6, annular members 42 each having an annular shape are provided, as engagement parts that engage with lock shafts 40, in housing 16 of tablet terminal 12. Annular member 42 includes through-hole 42a through which hook part 40b of lock shaft 40 can pass and which has substantially the same shape (that is, a slightly larger shape) as hook part 40b as viewed in the height direction (Z-axis direction).

Figure 7A:
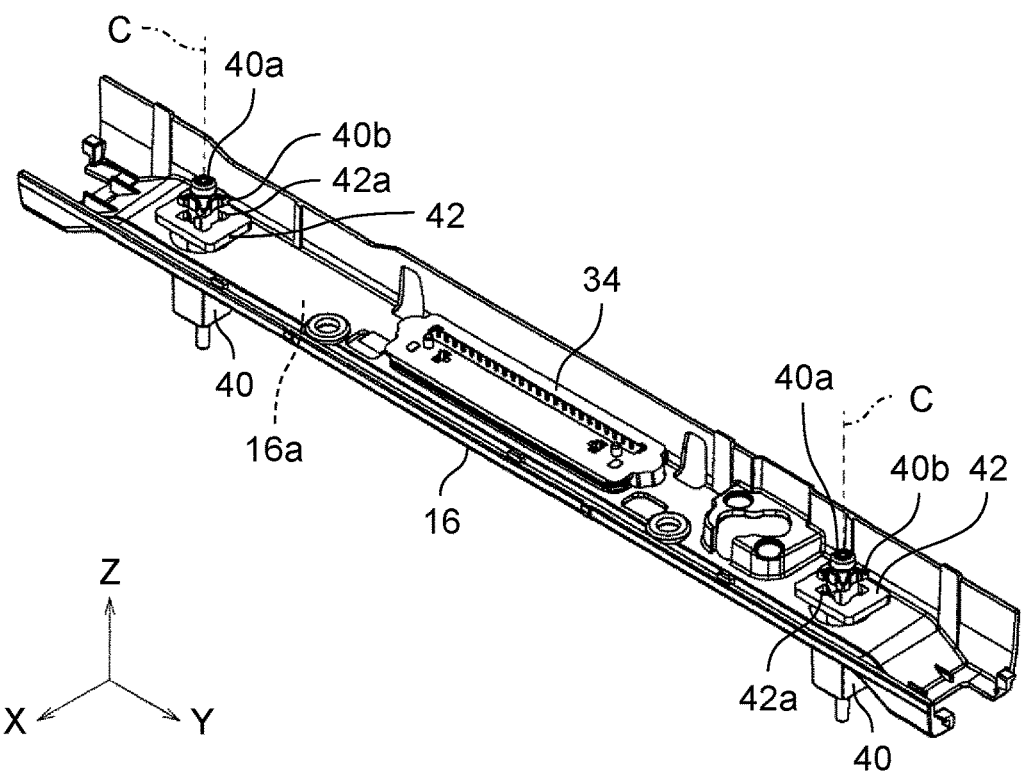
FIG. 7A is a perspective view illustrating a state (unlocked state) where a hook part of a lock shaft passes through a through-hole of an annular member.
Figure 7B:
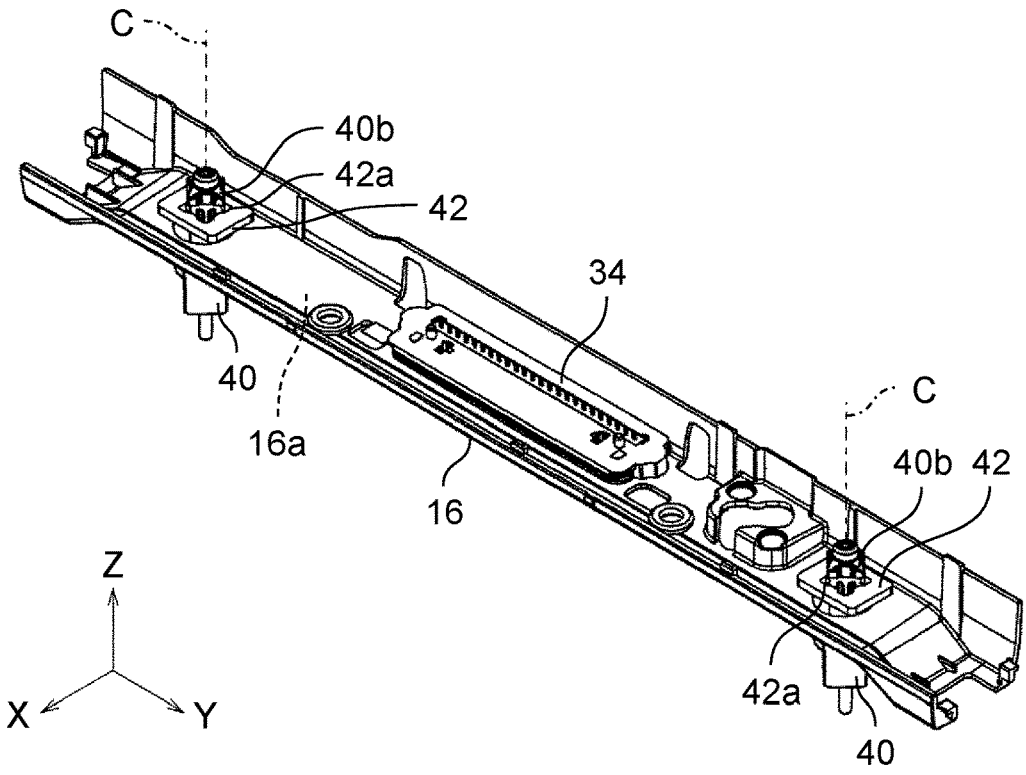
FIG. 7B is a perspective view illustrating a state (half-locked state) after the lock shaft rotates at a predetermined rotation angle.
Figure 7C:
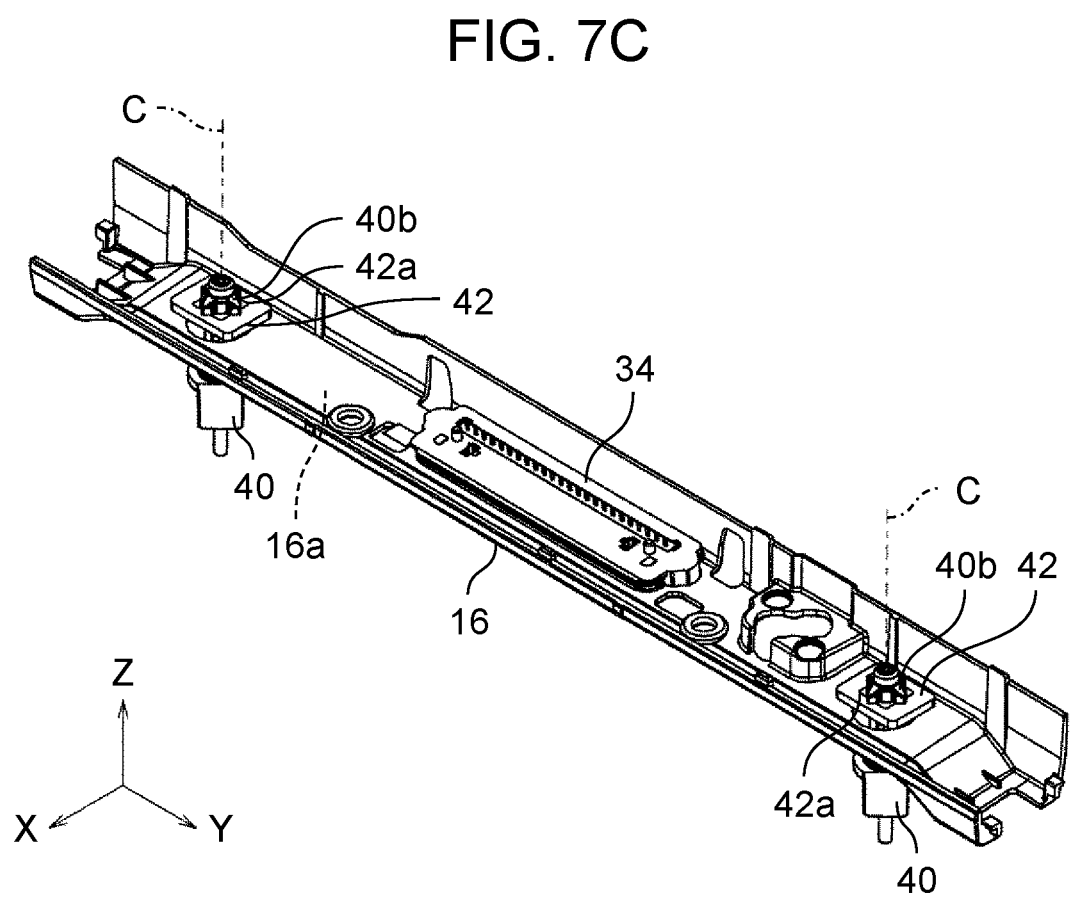

FIGS. 7A to 7C are perspective views illustrating a flow of engagement between the lock shaft and the annular member. FIG. 7A illustrates a state (unlocked state) where the hook part of the lock shaft passes through the through-hole of the annular member. In addition, FIG. 7B illustrates a state (half-locked state) after the lock shaft rotates at a predetermined rotation angle. FIG. 7C illustrates a state (locked state) where the hook part of the lock shaft is caught by the annular member.

First, as illustrated in FIG. 7A, hook part 40b of lock shaft 40 passes through through-hole 42a of annular member 42. As illustrated in FIG. 6, engagement part 40a of lock shaft 40 rotatably engages with engagement hole 16b provided in housing 16 of tablet terminal 12. Note that, an inner surface of socket 24 guides tablet terminal 12, and thus, lock shaft 40 can easily pass through through-hole 42a of annular member 42.

Subsequently, as illustrated in FIG. 7B, lock shaft 40 in a state where hook part 40b has passed through through-hole 42a of annular member 42 is rotated by a predetermined angle about rotation center line C. In the present exemplary embodiment, since hook part 40b has a square shape as viewed in the height direction (Z-axis direction), the predetermined angle is 45 degrees.

Then, as illustrated in FIG. 7C, hook part 40b of lock shaft 40 in a state of being rotated by the predetermined angle is shifted in the height direction (Z-axis direction) toward seating surfaces 30a and 32a of docking unit 26. Hook part 40b is shifted by, for example, 1 mm. By this shift and rotation of the predetermined angle, hook part 40b of lock shaft 40 is caught by annular member 42 without passing through through-hole 42a of annular member 42. As a result, tablet terminal 12 is pulled into the back of socket 24, and the state where docking surface 16a of tablet terminal 12 comes into contact with seating surfaces 30a and 32a of docking unit 26 is maintained. That is, as illustrated in FIG. 1, a position of tablet terminal 12 in the height direction (Z-axis direction) with respect to socket 24 (that is, docking unit 26 in socket 24) is fixed.

Note that, in the case of the present exemplary embodiment, in order to fix a position of tablet terminal 12 in the depth direction (X-axis direction) with respect to docking unit 26 and a position thereof in the width direction (Y-axis direction), positioning members 44 are provided in docking unit 26 (that is, socket 24) as illustrated in FIG. 6.

Specifically, positioning member 44 is made of an elastically deformable material and has a conical shape or a frusto-conical shape. In the present exemplary embodiment, positioning member 44 has a substantially quadrangular frusto-conical shape as illustrated in FIGS. 3 and 6. Specifically, positioning member 44 includes a pair of inclined surfaces facing an outside in the depth direction (X-axis direction) and a pair of inclined surfaces facing an outside in the width direction (Y-axis direction). In addition, positioning members 44 are provided at both ends of docking unit 26 in the width direction.

As illustrated in FIGS. 4 to 6, positioning holes 16*c* engaging with positioning members 44 are formed in docking surface 16*a* of housing 16 of tablet terminal 12. In addition, positioning hole 16*c* includes inner peripheral surface 16*d* having a conical surface shape of an inverted cone or a conical surface shape of an inverted frusto-cone. Specifically, inner peripheral surface 16*d* of positioning hole 16*c* includes a pair of inclined surfaces facing each other in the depth direction (X-axis direction) and a pair of inclined surfaces facing each other in the width direction (Y-axis direction). In addition, positioning holes 16*c* are formed at both ends of docking surface 16*a* of tablet terminal 12 in the width direction.

Positioning members 44 come into contact with inner peripheral surfaces 16*d* of positioning holes 16*c* and are elastically deformed. Specifically, as illustrated in FIG. 7C, when the state where docking surface 16*a* of tablet terminal 12 comes into contact with seating surfaces 30*a* and 32*a* of docking unit 26 is maintained by lock shaft 40, positioning members 44 elastically deform to come into close contact with inner peripheral surfaces 16*d* of positioning holes 16*c*. Positioning members 44 come into close contact with inner peripheral surfaces 16*d* of positioning holes 16*c*, and thus, as illustrated in FIG. 1, the position of tablet terminal 12 in the depth direction (X-axis direction) with respect to socket 24 (that is, docking unit 26 in socket 24) and the position thereof in the width direction (Y-axis direction) are fixed.

Note that, alternatively, the positioning members may be provided in tablet terminal 12, and the positioning holes may be provided in docking unit 26 (that is, the keyboard unit).

Next, as illustrated in FIGS. 7A to 7C, components that rotate lock shaft 40 about rotation center line C and shift the lock shaft 40 in the height direction (Z-axis direction) will be described. That is, a lock mechanism that pulls tablet terminal 12 into the back of socket 24 to maintain contact between tablet terminal 12 and socket 24 (that is, docking unit 26 in socket 24) will be described.

Figure 8A:
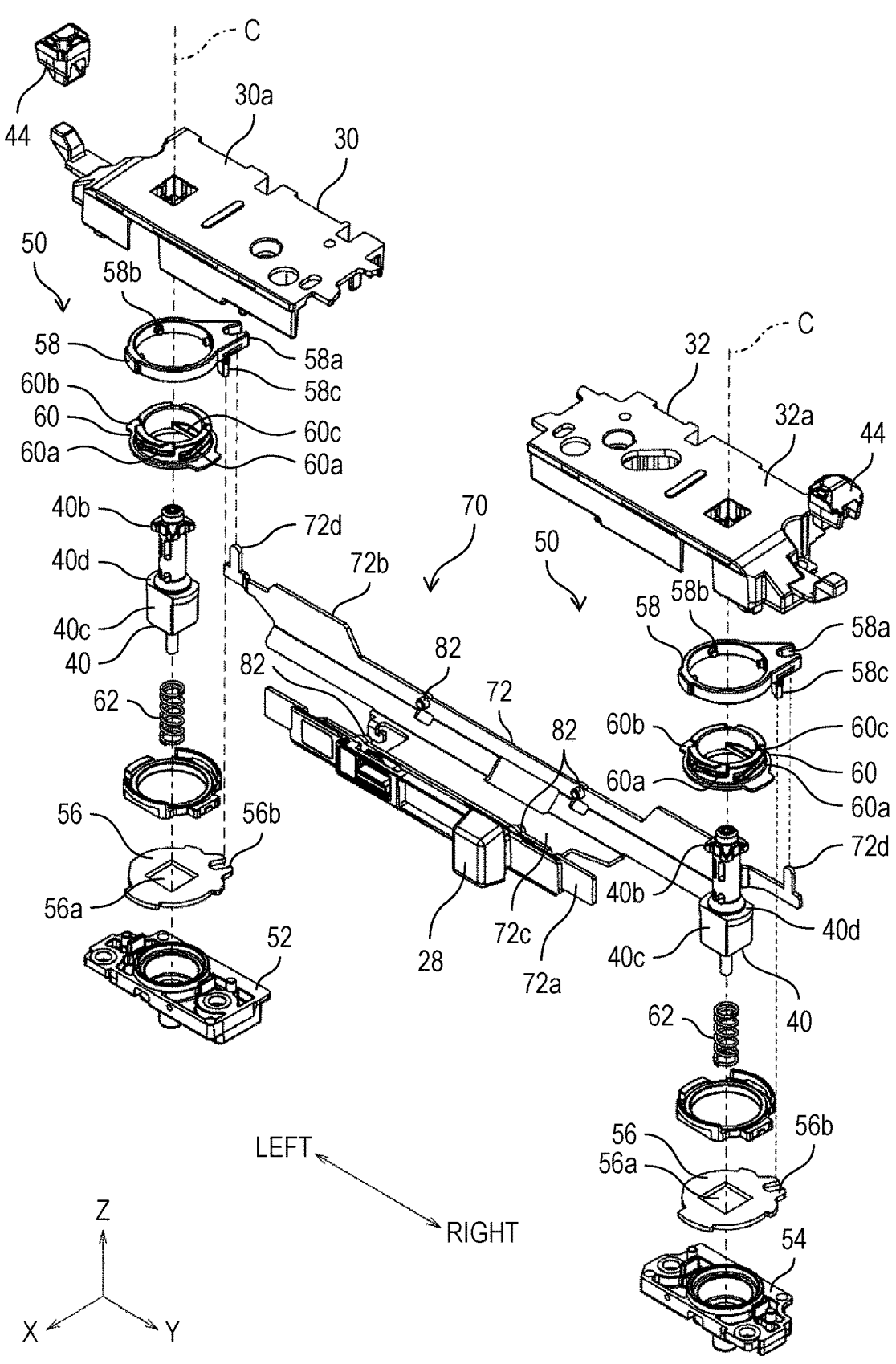
FIG. 8A is an exploded perspective view of a lock mechanism in the unlocked state corresponding to FIG. 7A.
Figure 8B:
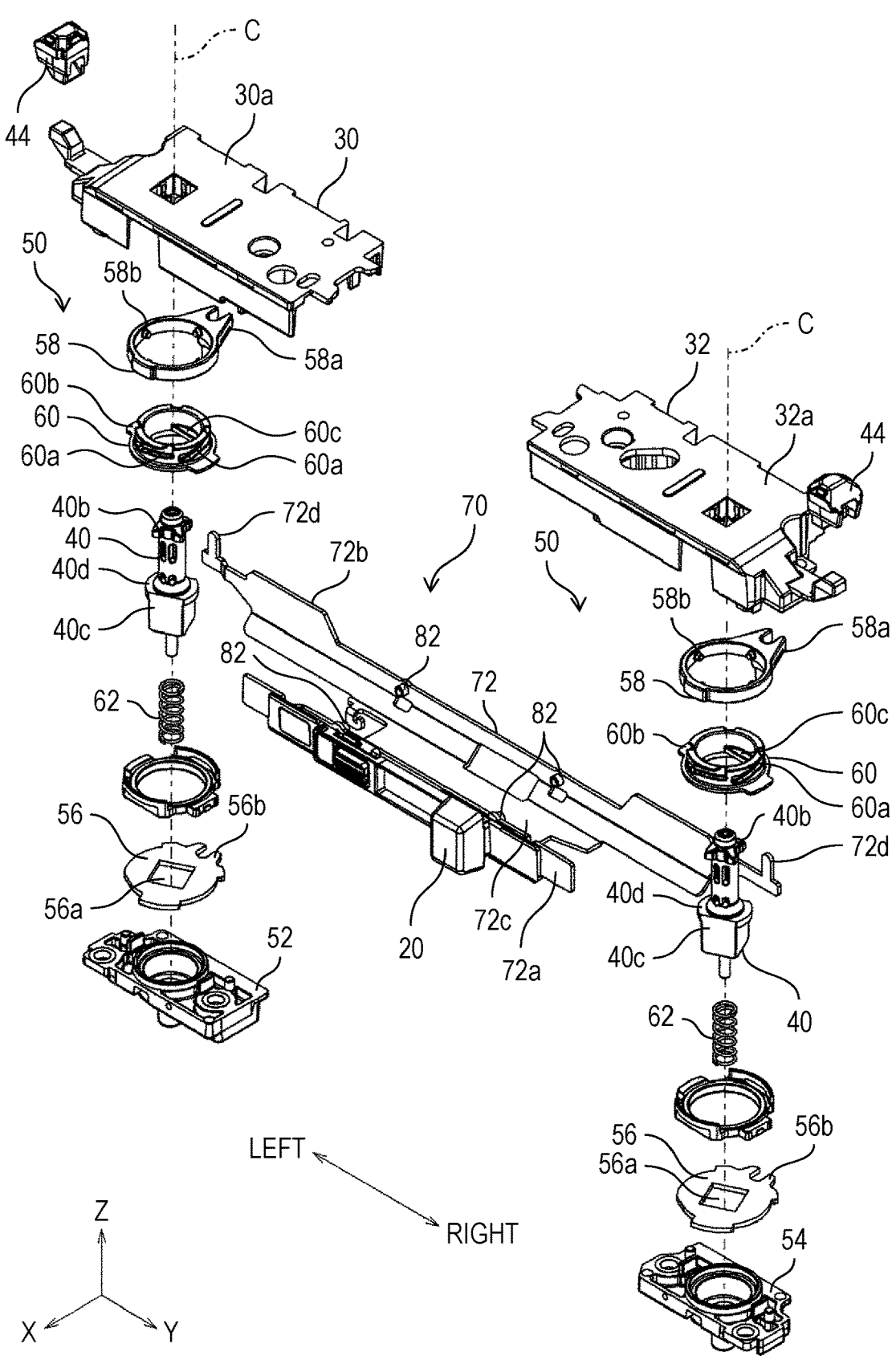
FIG. 8B is an exploded perspective view of the lock mechanism in the half-locked state corresponding to FIG. 7B.
Figure 8C:
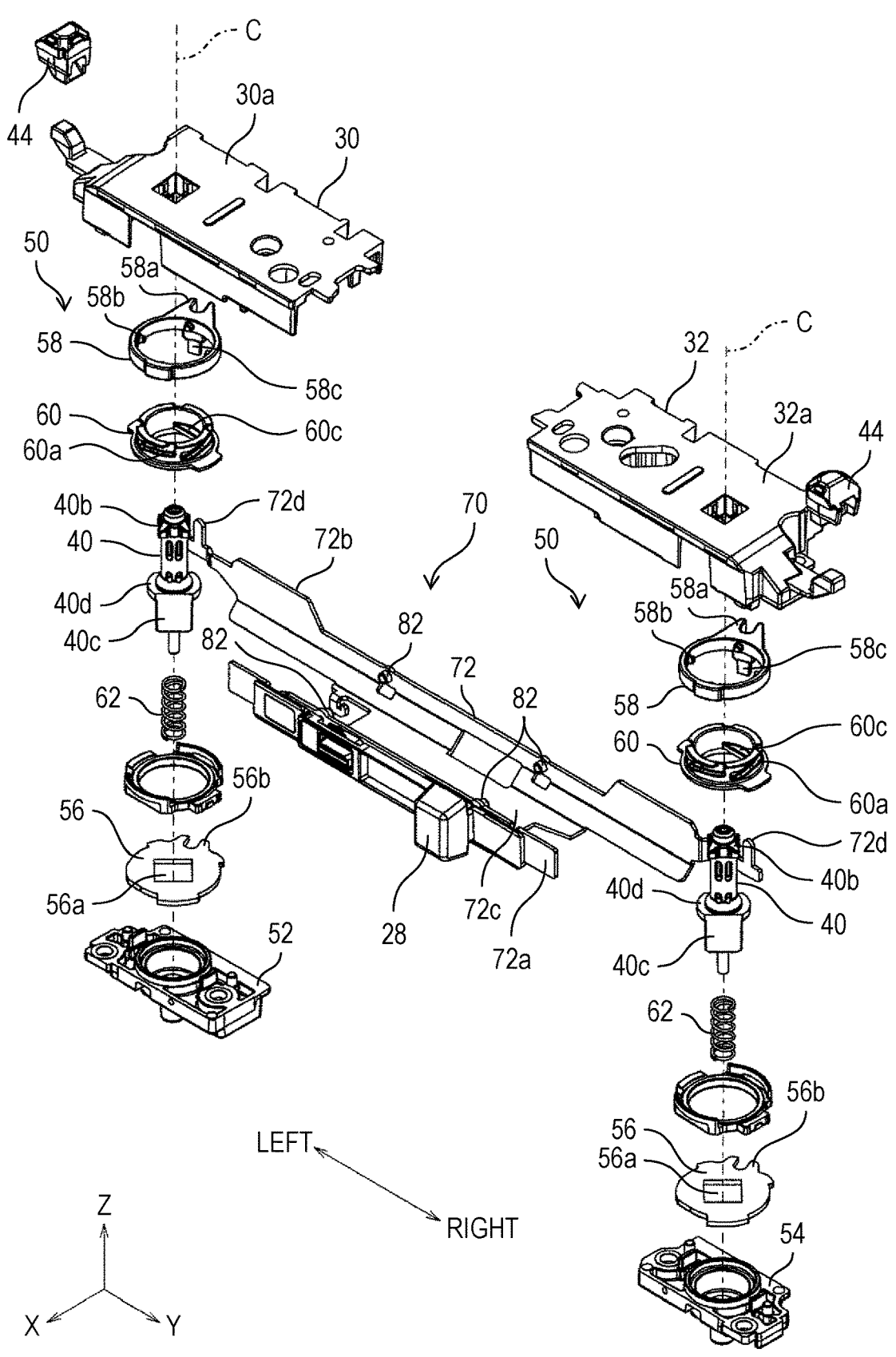
FIG. 8C is an exploded perspective view of the lock mechanism in the locked state corresponding to FIG. 7C.
Figure 9:
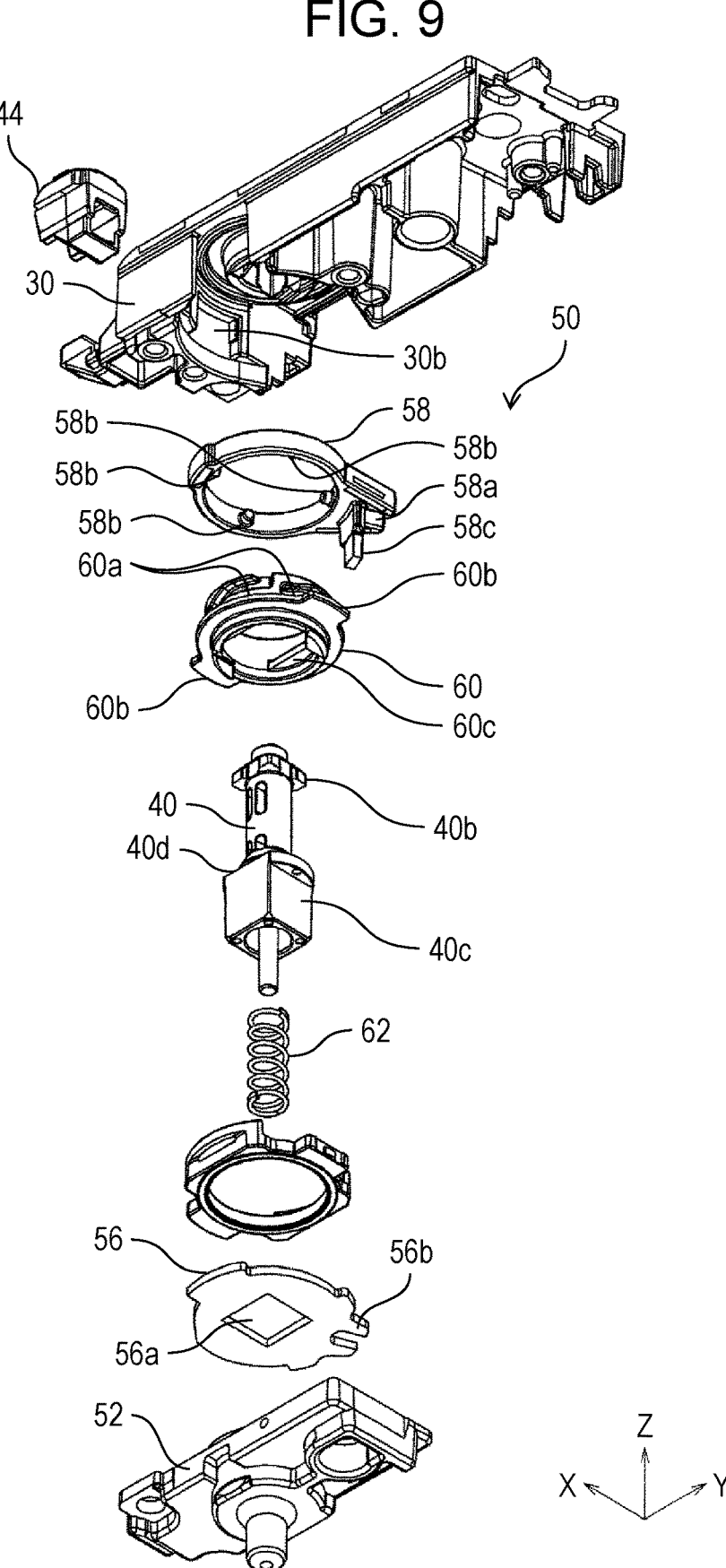
FIG. 9 is an exploded perspective view of the lock mechanism viewed from a different direction.

FIGS. 8A to 8C are exploded perspective views of the lock mechanism. FIG. 8A illustrates a lock mechanism corresponding to FIG. 7A, that is, in an unlocked state. In addition, FIG. 8B illustrates a lock mechanism corresponding to FIG. 7B, that is, in a half-locked state. Furthermore, FIG. 8C illustrates a lock mechanism corresponding to FIG. 7C, that is, in a locked state. FIG. 9 is an exploded perspective view of the lock mechanism as viewed from a different direction.

As illustrated in FIGS. 8A to 8C, a plurality of components constituting lock mechanism 50 are disposed between support members 30 and 32 and the base members 52 and 54. Base member 52 is fixed to support member 30, and base member 54 is attached to support member 32. Lock mechanism 50 includes, as the plurality of components, first rotating member 56, second rotating member 58, cam member 60, and spring 62 in addition to lock shaft 40 described above.

First rotating member 56 is rotatable about rotation center line C and holds lock shaft 40. Thus, first rotating member 56 includes through-hole 56*a* having a square shape, and lock shaft 40 includes shaft part 40*c* having a square cross section engaging with through-hole 56*a*. In addition, first rotating member 56 includes crank part 56*b* protruding in a direction orthogonal to rotation center line C.

Second rotating member 58 is a member that has an annular shape, that is rotatable about rotation center line C, and through which lock shaft 40 passes. In addition, second rotating member 58 includes crank part 58*a* protruding in a direction orthogonal to rotation center line C. Further, second rotating member 58 includes a plurality of cam followers 58*b* on an inner peripheral surface thereof. Second rotating member 58 includes claw part 58*c* that protrudes in an extending direction (Z-axis direction) of rotation center line C and engages with crank part 56*b* of first rotating member 56. Claw part 58*c* engages with crank part 56*b* of first rotating member 56, and thus, first rotating member 56 and second rotating member 58 rotate synchronously.

Figure 10:
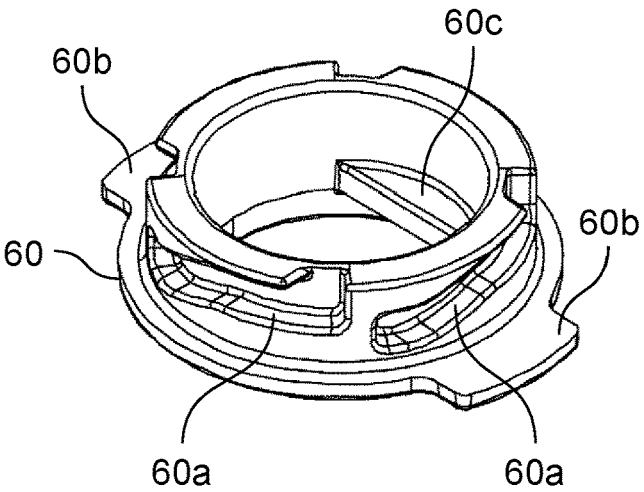
FIG. 10 is a perspective view of a cam member of the lock mechanism.

FIG. 10 is a perspective view of the cam member of the lock mechanism.

As illustrated in FIGS. 8A and 10, cam member 60 of lock mechanism 50 is a member that has a cylindrical shape and through which lock shaft 40 passes. Cam member 60 includes a plurality of cam grooves 60*a* that engage with the plurality of cam followers 58*b* of second rotating member 58 on an outer peripheral surface thereof. Cam groove 60*a* extends in the extending direction (Z-axis direction) of rotation center line C while extending in a circumferential direction. Further, cam member 60 includes rotation stopper part 60*b* that protrudes in a direction orthogonal to rotation center line C not to rotate about rotation center line C. As illustrated in FIG. 9, rotation stopper part 60*b* is provided on a back side of support member 30 (support member 32) and engages with guide groove 30*b* (guide groove of support member 32) extending in the extending direction of rotation center line C.

Such cam groove 60*a* is provided. Thus, when second rotating member 58 rotates about rotation center line C, cam member 60 is shifted in the extending direction of rotation center line C (Z-axis direction). Due to this shifting of cam member 60, hook part 40*b* of lock shaft 40 is shifted toward seating surfaces 30*a* and 32*a* of docking unit 26 in the extending direction of rotation center line C, as illustrated in FIGS. 7B and 7C. Thus, cam member 60 includes lever part 60*c* that comes into contact with the shoulder part 40*d* of lock shaft 40. Cam member 60 is shifted in a state where lever part 60*c* comes into contact with shoulder part 40*d*, and thus, lock shaft 40 is shifted.

Spring 62 biases lock shaft 40 in a direction in which hook part 40*b* of lock shaft 40 is separated from seating surfaces 30*a* and 32*a* of docking unit 26.

According to lock mechanism 50 having such a configuration, second rotating member 58 rotates, and thus, first rotating member 56 rotates to rotate lock shaft 40. Accordingly, cam member 60 is shifted to shift lock shaft 40. Accordingly, an operation of lock shaft 40 illustrated in FIGS. 7A to 7C is realized.

Second rotating member 58 of lock mechanism 50 is rotated by the user operating lock knob 28 (an example of a knob). Thus, docking unit 26 includes link mechanism 70.

As illustrated in FIG. 8A, link mechanism 70 includes, as components, slide member 72 that slides in the width direction (Y-axis direction) in addition to lock knob 28 described above.

Slide member 72 is provided in docking unit 26 to be slidable in the width direction (Y-axis direction). In addition, slide member 72 includes first slide plate 72*a* that has a thin plate shape and to which lock knob 28 is attached, second slide plate 72*b* having a thin plate shape and parallel to first slide plate 72*a* at an interval in the depth direction (X-axis direction), and connection plate 72c connecting these plates. At both ends of second slide plate 72b in the width direction, claw parts 72d protruding in the height direction (Z-axis direction) and engaging with crank part 58a of second rotating member 58 of lock mechanism 50 are provided. Accordingly, when the user moves lock knob 28 in the width direction, slide member 72 slides in the width direction, and thus, second rotating member 58 rotates. In addition, first rotating member 56 engaging with slide member 72 via second rotating member 58 also rotates in synchronization. Note that, the claw part engaging with crank part 56b of first rotating member 56 may be provided in the slide member 72, and slide member 72 may directly rotate first rotating member 56.

Link mechanism 70 operates lock mechanism 50 and also operates a connector holder shift mechanism.

Figure 11:
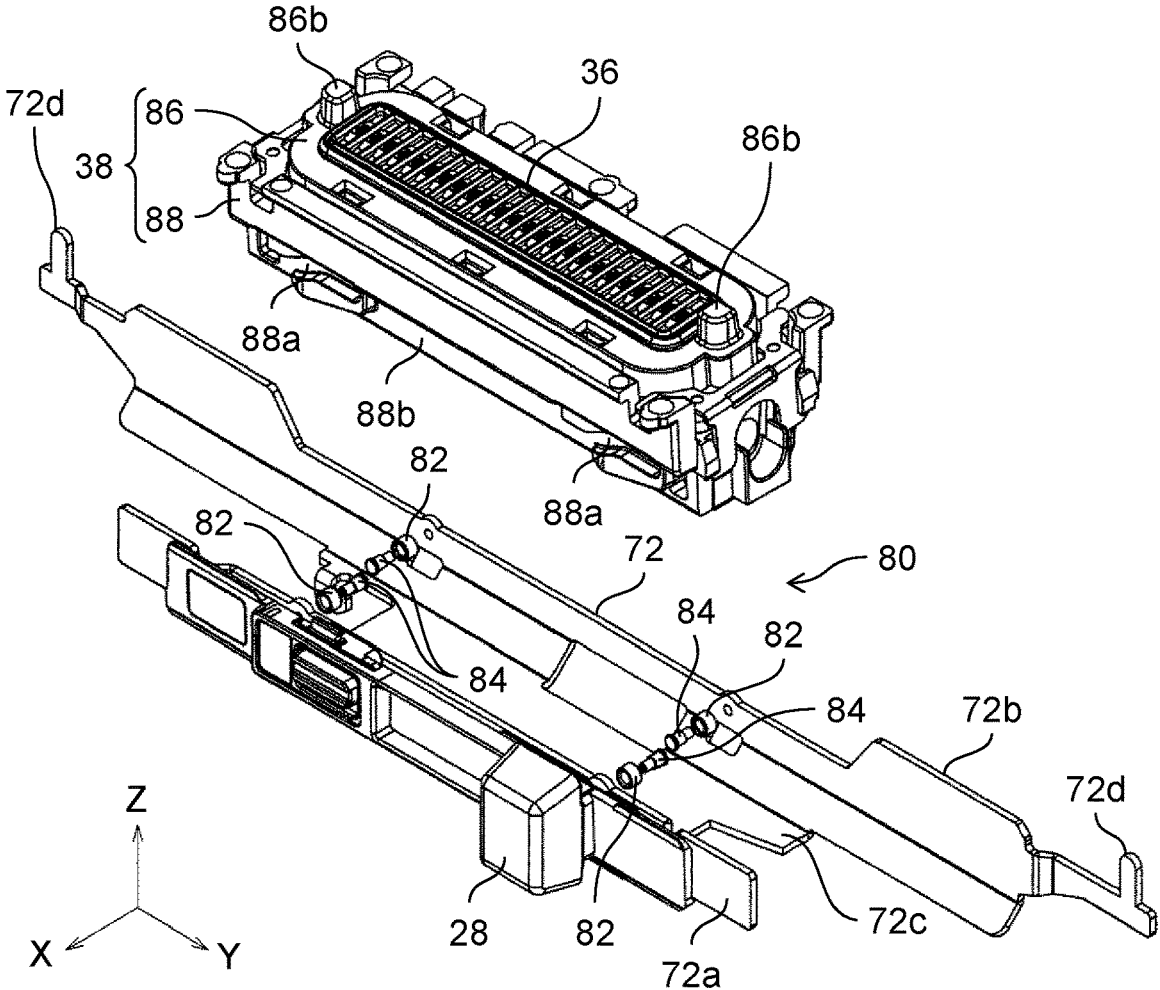
FIG. 11 is an exploded perspective view of a connector holder shift mechanism.
Figure 12:
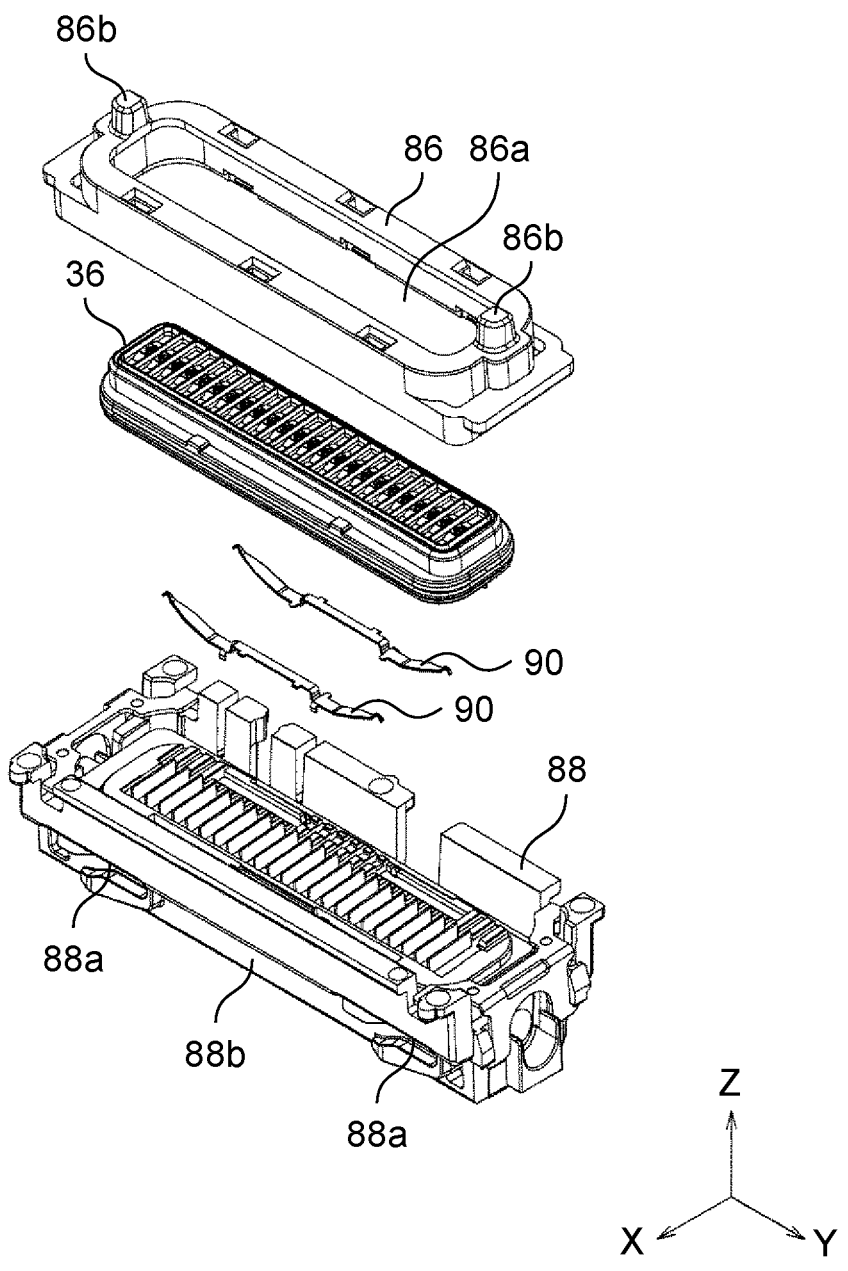
FIG. 12 is an exploded perspective view of a connector holder.

FIG. 11 is an exploded perspective view of the connector holder shift mechanism. In addition, FIG. 12 is an exploded perspective view of the connector holder.

As illustrated in FIG. 11, connector holder shift mechanism 80 is a mechanism for shifting connector holder 38 in the height direction (Z-axis direction), and includes a plurality of cam follower rollers 82 and cam grooves 88a formed in connector holder 38 and engaging with cam follower rollers 82.

The plurality of cam follower rollers 82 are attached to first and second slide plates 72a and 72b of slide member 72 via support pins 84 to be rotatable about the rotation center line extending in the depth direction (X-axis direction).

In the case of the present exemplary embodiment, connector holder 38 holds second connector 36 to be movable in the height direction (Z-axis direction). Connector holder 38 includes cover member 86 including connector accommodation hole 86a through which second connector 36 slides in the height direction, and housing member 88 that stores a board or the like electrically connected to second connector 36. The plurality of cam grooves 88a are formed on both side surfaces 88b of housing member 88 in the depth direction (X-axis direction).

Connector holder 38 is disposed between first slide plate 72a and second slide plate 72b of slide member 72. Accordingly, the plurality of cam follower rollers 82 attached to first and second slide plates 72a and 72b engage with cam grooves 88a of connector holder 38.

Figure 13A:
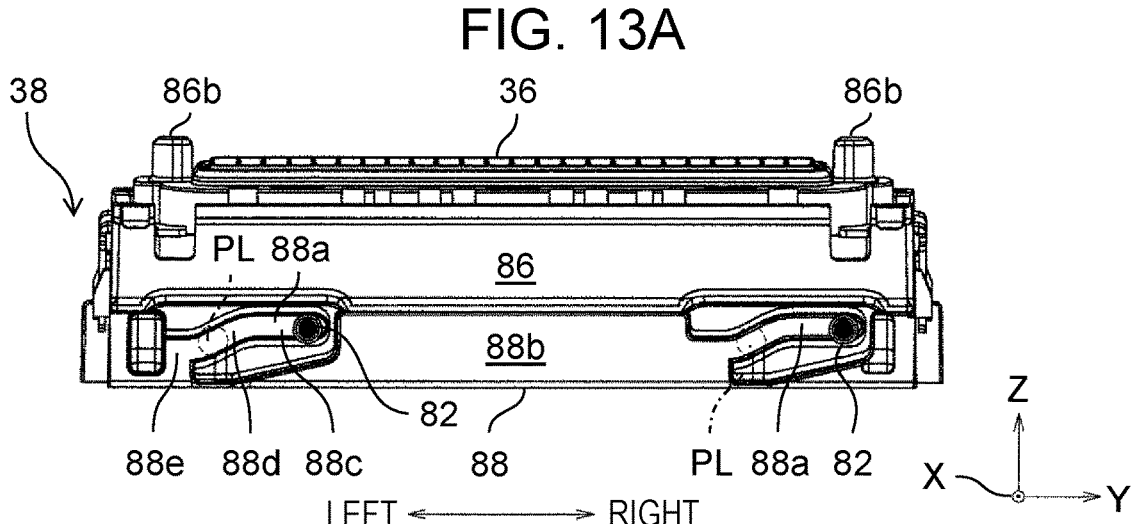
FIG. 13A is a diagram illustrating a position of a cam follower roller in the connector holder shift mechanism in the unlocked state corresponding to FIG. 7A.
Figure 13B:
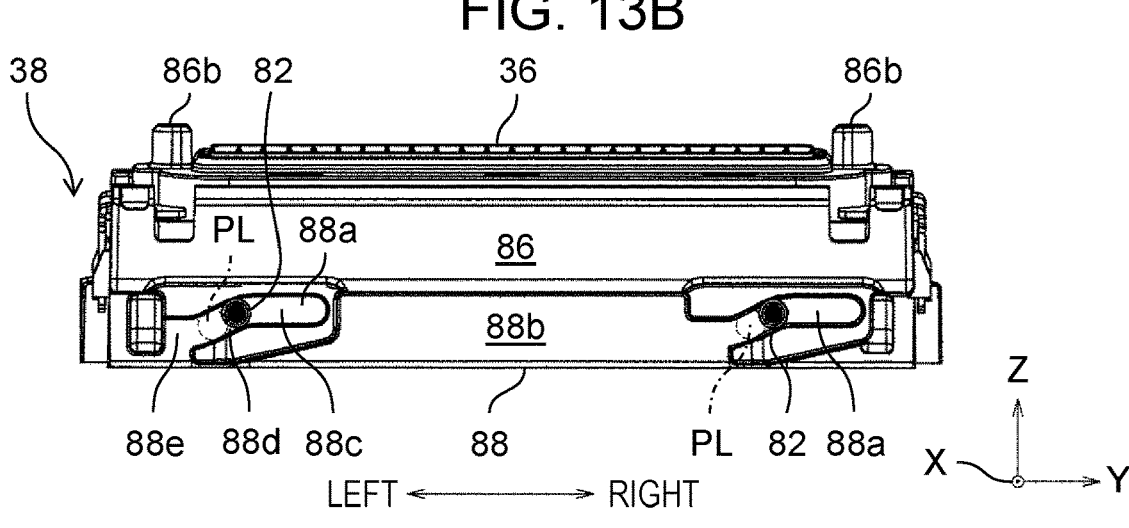
FIG. 13B is a diagram illustrating a position of the cam follower roller in the connector holder shift mechanism in the half-locked state corresponding to FIG. 7B.
Figure 13C:
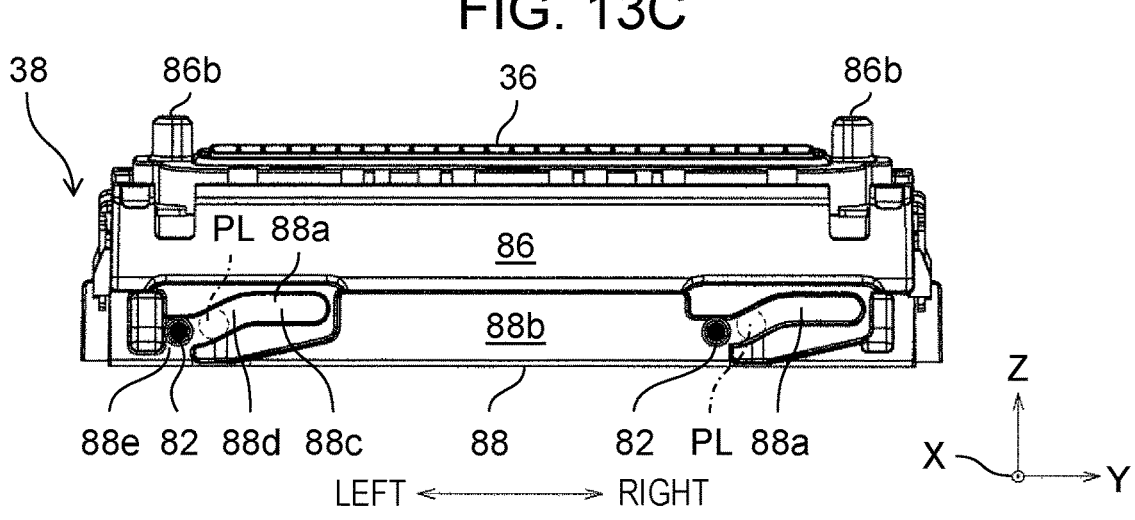
FIG. 13C is a diagram illustrating a position of the cam follower roller in the connector holder shift mechanism in the locked state corresponding to FIG. 7C.

FIG. 13A is a diagram illustrating a position of the cam follower roller in the connector holder shift mechanism in the unlocked state corresponding to FIG. 7A. In addition, FIG. 13B is a diagram illustrating a position of the cam follower roller in the connector holder shift mechanism in the half-locked state corresponding to FIG. 7B. FIG. 13C is a diagram illustrating a position of the cam follower roller in the connector holder shift mechanism in the locked state corresponding to FIG. 7C.

As illustrated in FIGS. 13A to 13C, when slide member 72 slides in the width direction (Y-axis direction), the plurality of cam follower rollers 82 rotate in cam groove 88a and move in the width direction. Accordingly, connector holder 38 is shifted in the height direction (Z-axis direction). That is, cam groove 88a is configured such that connector holder 38 is shifted in the height direction by the movement of cam follower roller 82 in the width direction. Specifically, cam groove 88a includes first horizontal groove 88c extending in the width direction, inclined groove 88d connected to a left end of first horizontal groove 88c and inclined in a direction separated from tablet terminal 12 (downward in the drawing), and second horizontal groove 88e connected to a left end of inclined groove 88d and extending in the width direction.

Link operations of lock mechanism 50, link mechanism 70, and connector holder shift mechanism 80 will be described below. First, the user attaches tablet terminal 12 to socket 24. Accordingly, as illustrated in FIG. 7A, lock shaft 40 passes through through-hole 42a of annular member 42.

In this state, when the user moves lock knob 28 from an unlock position (rightmost position) to a left side, that is, when slide member 72 slides to the left side, cam follower roller 82 moves in first horizontal groove 88c of cam groove 88a as illustrated in FIG. 13A. While cam follower roller 82 moves in first horizontal groove 88c, connector holder 38 does not move in the height direction (Z-axis direction).

When the user further moves lock knob 28 to the left side, cam follower roller 82 enters inclined groove 88d from first horizontal groove 88c and moves in inclined groove 88d. Accordingly, connector holder 38 is shifted toward tablet terminal 12.

When the user further moves lock knob 28 to the left side, cam follower roller 82 reaches lock completion position PL. A timing at which cam follower roller 82 reaches lock completion position PL is a timing at which hook part 40b of lock shaft 40 is caught by annular member 42 as illustrated in FIG. 7C. That is, the rotation and shift of lock shaft 40 illustrated in FIGS. 7A to 7C are completed while the user moves lock knob 28 from the unlock position (rightmost position) to the left side and cam follower roller 82 reaches lock completion position PL. Accordingly, this timing is timing at which tablet terminal 12 is completely fixed to socket 24 (that is, docking unit 26). Cam groove 60a of cam member 60 of lock mechanism 50 has a shape that realizes this timing.

When the user further moves lock knob 28 to the left side, cam follower roller 82 moves in inclined groove 88d from lock completion position PL toward the second horizontal groove 88e. Immediately before cam follower roller 82 enters second horizontal groove 88e, second connector 36 held by connector holder 38 comes into contact with first connector 34 of tablet terminal 12. When the user moves lock knob 28 to the left side, cam follower roller 82 moves into second horizontal groove 88e, and the shift of connector holder 38 is ended. Accordingly, the electrical connection between first connector 34 and second connector 36 is completed. Then, lock knob 28 reaches a lock position (leftmost position).

Note that, in the case of the present exemplary embodiment, as illustrated in FIG. 12, in order to prevent second connector 36 from coming into contact with first connector 34 with an excessive contact pressure, elastic member 90 that supports second connector 36 is provided in connector holder 38 in a contact direction (height direction (Z-axis direction)) between first connector 34 and second connector 36. Elastic member 90 is, for example, a leaf spring. Such elastic member 90 is elastically deformed, and thus, first connector 34 and second connector 36 are prevented from coming into contact with each other with the excessive contact pressure and being damaged. Note that, alternatively, an elastic member that supports first connector 34 in the contact direction may be provided in tablet terminal 12.

In addition, as illustrated in FIG. 11, a plurality of guide pins 86b protruding in the height direction are provided in cover member 86 of connector holder 38 such that connector holder 38 moves only in the height direction (Z-axis direction) with respect to the movement of cam follower roller 82 in the width direction (Y-axis direction). In contrast, as illustrated in FIGS. 4 to 5, guide holes 34*a* that engage with the plurality of guide pins 86*b* are provided in first connector 34 of tablet terminal 12.

When the user moves lock knob 28 from the lock position (leftmost position) to a right side, cam follower roller 82 moves from second horizontal groove 88*e* toward inclined groove 88*d*. When cam follower roller 82 enters inclined groove 88*d*, connector holder 38 starts to be shifted in the direction separated from tablet terminal 12. As a result, the contact between first connector 34 and second connector 36 is released, and the electrical connection is released.

When the user further moves lock knob 28 to the right side, cam follower roller 82 passes through lock completion position PL. At the same time, hook part 40*b* of lock shaft 40 starts to be separated from annular member 42.

When the user further moves lock knob 28 to the right side, cam follower roller 82 enters first horizontal groove 88*c* from inclined groove 88*d*. Then, lock knob 28 reaches the unlock position (rightmost position), and as illustrated in FIG. 7A, lock shaft 40 enters a state where hook part 40*b* can pass through through-hole 42*a* of annular member 42.

According to the present exemplary embodiment described above, in detachable PC 10 including tablet terminal 12 and socket 24 that are detachably attached to each other, it is possible to suppress disconnection due to vibration of the electrical connection between tablet terminal 12 and keyboard unit 14, that is, the electrical connection between first connector 34 and second connector 36.

Specifically, as illustrated in FIG. 7C, hook part 40*b* of lock shaft 40 pulls annular member 42 of tablet terminal 12 into the back of socket 24 (toward docking unit 26), and thus, the contact between tablet terminal 12 and docking unit 26 can be firmly maintained. As a result, first connector 34 of tablet terminal 12 and second connector 36 of docking unit 26 can continue to come into firm contact. As a result, it is possible to suppress disconnection due to vibration of the electrical connection between tablet terminal 12 and keyboard unit 14.

Although the present disclosure has been described above by taking the above exemplary embodiment as an example, the present disclosure is not limited to the above exemplary embodiment.

For example, in the above exemplary embodiment, link mechanism 70 links an operation of fixing tablet terminal 12 to socket 24 by lock mechanism 50 and an operation of electrically connecting second connector 36 to first connector 34 by connector holder shift mechanism 80. However, the exemplary embodiment of the present disclosure is not limited thereto. The completion of the operation of fixing tablet terminal 12 to socket 24 may be detected by a contact sensor or the like, and second connector 36 may approach first connector 34 to be electrically connected based on the detection result.

In addition, in the case of the above exemplary embodiment, as illustrated in FIGS. 7A to 7C, tablet terminal 12 is pulled into the back of socket 24 through lock shaft 40 including hook part 40*b*. However, the exemplary embodiment of the present disclosure is not limited thereto.

Further, the above exemplary embodiment is detachable PC 10 including tablet terminal 12 and keyboard unit 14 that are detachably attached to each other, but the exemplary embodiment of the present disclosure is not limited thereto.

That is, in a broad sense, an exemplary embodiment of the present disclosure is an electronic device including a first unit and a second unit that are detachably attached to each other. The electronic device includes a first connector provided in the first unit, a socket provided in the second unit, the first unit being attached to and detached from the socket in a first direction, a second connector provided in the socket, the second connector coming into contact with the first connector in the first direction to be electrically connected, and a lock mechanism provided in the socket, the lock mechanism pulling the first unit into a back of the socket in the first direction to maintain contact between the first unit and the socket.

As described above, the exemplary embodiments have been described as examples of the technique according to the present disclosure. Thus, the accompanying drawings and the detailed description have been provided. Accordingly, in order to illustrate the above technique, the components described in the accompanying drawings and the detailed description may include not only components that are essential for solving the problem but also components that are not essential for solving the problem. For this reason, it should not be immediately construed that those non-essential components are essential only based on the fact that those non-essential components are illustrated in the accompanying drawings or described in the detailed description.

In addition, since the above-described exemplary embodiments are intended to exemplify the technique according to the present disclosure, various modifications, replacements, additions, and omissions can be made within the scope of the appended claims or of their equivalents.

The present disclosure is applicable to an electronic device in which a first unit and a second unit that are detachable from each other are electrically connected.

What is claimed is:

1. An electronic device including a first unit and a second unit that are detachably attached to each other, the electronic device comprising:

a first connector that is provided in the first unit;

a socket that is provided in the second unit, the first unit being attached to and detached from the socket in a first direction;

a second connector that is provided in the socket, the second connector coming into contact with the first connector in the first direction to be electrically connected; and a lock mechanism that is provided in the socket, the lock mechanism pulling the first unit into the socket in the first direction for contact between the first unit and the socket, wherein the first unit includes an annular member, the lock mechanism includes:

a lock shaft that rotates about a rotation center line extending in the first direction and is shifted in the first direction, a first rotating member holding the lock shaft, being rotatable about the rotation center line, a second rotating member being rotatable about the rotation center line, and a cam member being movable in the first direction, engaging with the second rotating member, and shifting the lock shaft in the first direction, the second rotating member engages with the first rotating member, and the first rotating member and the second rotating member rotate synchronously for a state where the lock shaft is caught on the annular member.

2. The electronic device according to claim 1, wherein the lock shaft includes a hook part having a non-circular shape as viewed in the first direction, and the annular member has an annular shape that includes a through-hole having the non-circular shape as viewed in the first direction, the hook part being configured to pass through the through-hole, and the hook part of the lock shaft in a state of being rotated at a predetermined rotation angle being caught on the annular member.

3. The electronic device according to claim 1, further comprising:

a slide member that slides in a second direction orthogonal to the first direction; and a knob that is provided in the slide member, wherein the first rotating member includes a crank part connected to a claw part of the second rotating member, the second rotating member has an annular shape, includes a cam follower on an inner peripheral surface, and includes a crank part coupled to the slide member, and the cam member has a cylindrical shape, includes a cam groove extending in the first direction while extending in a circumferential direction on an outer peripheral surface, and engages with the cam follower.

4. The electronic device according to claim 1, wherein the second connector is provided in the socket to be movable in the first direction, and an elastic member that supports the second connector in the first direction is provided in the socket.

5. The electronic device according to claim 1, wherein a positioning member having a conical shape or a frusto-conical shape elastically deformed is provided in one of the first unit and the socket, a positioning hole including an inner peripheral surface having a conical surface shape of an inverted cone or a conical surface shape of an inverted frusto-cone and engaging with the positioning member is provided in another of the first unit and the socket, and in a state where the lock mechanism pulls the first unit into the back of the socket, the positioning member comes into contact with the inner peripheral surface of the positioning hole to be elastically deformed.

6. The electronic device according to claim 5, wherein the positioning member has a square frusto-conical shape, and the inner peripheral surface of the positioning hole has a conical surface shape of an inverted square frusto-cone.

7. The electronic device according to claim 1, wherein the first unit is a tablet terminal including a touch screen, and the second unit is a keyboard unit including a keyboard.

8. The electronic device according to claim 1, wherein the first rotating member includes a crank part protruding in a direction orthogonal to the rotation center line, and the second rotating member includes a claw part that protrudes in an extending direction of the rotation center line and engages with the crank part of the first rotating member.

9. The electronic device according to claim 1, wherein the first rotating member includes a through-hole, and the lock shaft includes a shaft part having a square cross section engaging with the through-hole.

10. The electronic device according to claim 1, wherein the cam member, through which the lock shaft passes, includes a lever part that comes into contact with the lock shaft.

11. The electronic device according to claim 1, wherein the cam member is disposed between the first rotating member and the second rotating member in the first direction.

12. The electronic device according to claim 1, wherein the cam member is shifted in the first direction to cause the lock shaft in a state of being rotated at a predetermined rotation angle to be shifted in the first direction toward the socket.

13. The electronic device according to claim 1, further comprising:

a slide member that slides in a second direction orthogonal to the first direction; and a housing member that holds the second connector and is shifted in the first direction, wherein a plurality of cam follower rollers are attached to the slide member, a cam groove is formed in the housing member, the cam groove engaging with the plurality of cam follower rollers, and the housing member is shifted in the first direction by sliding of the slide member in the second direction.

14. The electronic device according to claim 1, further comprising a housing member that holds the second connector and is shifted in the first direction, wherein an elastic member is provided in the socket and supports the second connector in the first direction, and the elastic member is disposed between the second connector and the housing member in the first direction.

* * * * *